United States Patent [19]
Yajima

[11] Patent Number: 5,423,213
[45] Date of Patent: Jun. 13, 1995

[54] THERMAL FLOWMETER HAVING IMPROVED DURABILITY AGAINST THERMAL STRESS

[75] Inventor: Yasuhito Yajima, Nagoya, Japan

[73] Assignee: NGK Insulators, Ltd., Japan

[21] Appl. No.: 186,176

[22] Filed: Jan. 25, 1994

[30] Foreign Application Priority Data

Feb. 4, 1993 [JP] Japan .................................. 5-017726

[51] Int. Cl.⁶ .................................................. G01F 1/68
[52] U.S. Cl. .................................................. 73/204.26
[58] Field of Search ........... 73/204.22, 204.25, 204.26, 73/204.27

[56] References Cited

U.S. PATENT DOCUMENTS

| | | | |
|---|---|---|---|
| 3,333,470 | 8/1967 | Fingerson | 73/204.26 |
| 4,297,881 | 11/1981 | Sasayama et al. | 73/204.14 |
| 4,513,615 | 4/1985 | Sato et al. | 73/204.25 |
| 4,549,433 | 10/1985 | Greiss et al. | 73/204.26 |
| 5,144,279 | 9/1992 | Yajima et al. | 338/270 |
| 5,224,378 | 7/1993 | Yajima et al. | 73/204.27 |

FOREIGN PATENT DOCUMENTS

| | | |
|---|---|---|
| 55-43447 | 3/1980 | Japan . |
| 56-77716 | 6/1981 | Japan . |
| 60-91211 | 5/1985 | Japan . |
| 0236023 | 11/1985 | Japan .................................. 73/204.26 |

*Primary Examiner*—Richard E. Chilcot, Jr.
*Assistant Examiner*—Harshad Patel
*Attorney, Agent, or Firm*—Parkhurst, Wendel & Rossi

[57] ABSTRACT

A thermal flowmeter for determining a parameter of a fluid flowing through a passage, includes: (a) resistor element including: an electrically insulating substrate; a metallic resistor supported by the substrate and having an electrical resistance which varies with an ambient temperature; and a pair of electrical conductors provided at opposite ends of the substrate and (b) electrically connected to the metallic resistor; and a pair of electrically conductive supports, fixed to a wall defining the passage, for securing the pair of electrical conductors, respectively, at securing portions in the pair of supports so that the resistor element is arranged in the passage; wherein a first distance between the pair of supports at the wall is smaller than a second distance between the pair of supports at the securing portions. The thermal flowmeter is durable under thermal stresses, especially when an ambient temperature around the thermal flowmeter frequently varies.

14 Claims, 6 Drawing Sheets

FIG. 5 - PRIOR ART
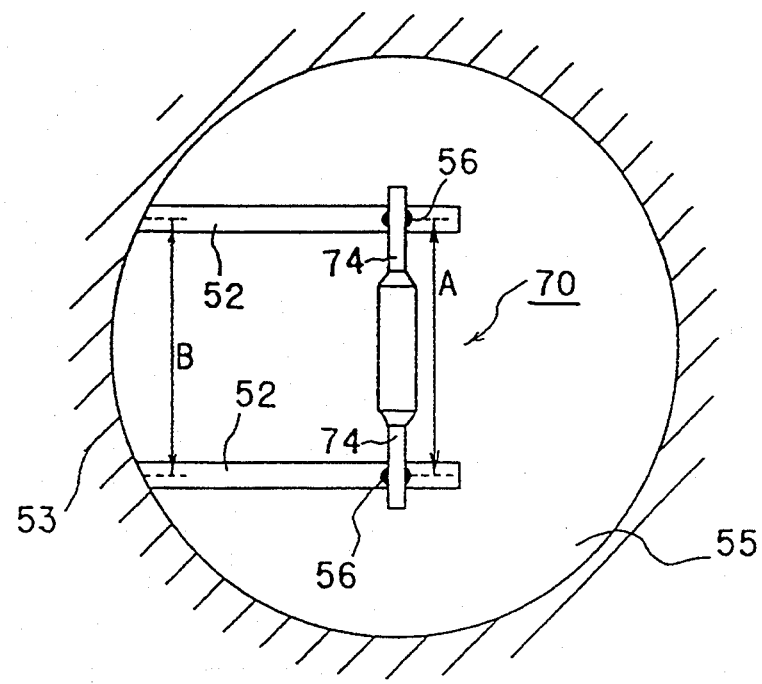
FIG. 6 - PRIOR ART
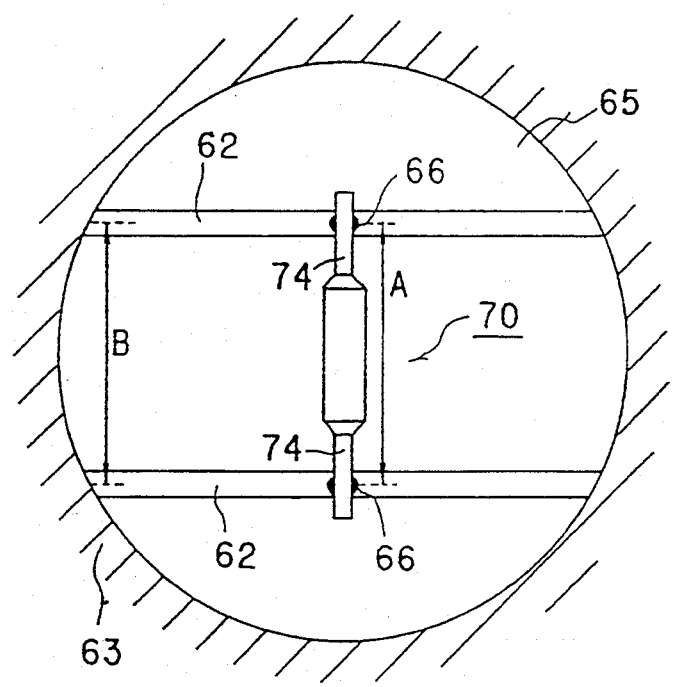

FIG. 7 - PRIOR ART
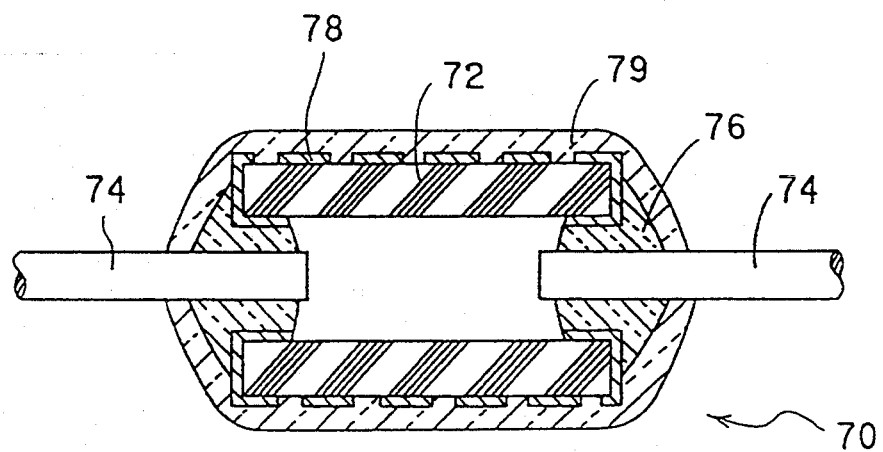

THERMAL FLOWMETER HAVING IMPROVED DURABILITY AGAINST THERMAL STRESS

BACKGROUND OF THE INVENTION

1. Field of the Invention

The present invention relates to a thermal flowmeter including at least one resistor element that uses temperature dependence of its electrical resistance to determine a flow rate or velocity of a fluid flowing through a passage. The present invention improves such a flowmeter so as to make the flowmeter more durable under thermal stresses.

2. Discussion of the Related Art

A flowmeter measures flow rate, velocity, or temperature of a fluid, and the fluid may be an intake air introduced into an internal combustion engine. One type of the flowmeter is a thermal flowmeter that includes resistor elements whose electrical resistance varies with an ambient temperature. This thermal flowmeter is disclosed, for example, in laid-open Publication Nos. 55-43447, 56-77716, and 60-91211 of unexamined Japanese Patent Application. U.S. Pat. Nos. 5,224,378 and 5,144,279 also discloses such a thermal flowmeter.

In FIG. 7, the resistor element 70 includes: an electrically insulating substrate 72 having a tubular shape; a metallic resistor 78 disposed around an outer peripheral surface of the substrate 72; a glass coat 79 covering the metallic resistor; and a pair of lead wires 74, 74 fixed to both ends of the electrically insulating substrate 72, the pair of lead wires 74, 74 being electrically connected to the metallic resistor 78. The metallic resistor 78 varies its electrical resistance with an ambient temperature. The metallic resistor may be a metallic film including platinum, etc., and the metallic film may have a spiral pattern. Alternatively, the metallic resistor may be a fine wire winding around the substrate. In either type of the metallic resistor, the glass coat covers the whole substrate and the metallic resistor.

In a thermal flowmeter of FIG. 5, a wall 53 defines a fluid passage 55. A pair of supports 52, 52, which are electrically conductive, protrude from portions, which are electrically insulating, of the wall 53. The pair of supports support the resistor element 70 so that the resistor element is arranged in the fluid passage 55. A pair of lead wires 74, 74 are secured to the pair of respective supports 52, 52 by welding such as spot welding and laser welding.

In the thermal flowmeter of FIG. 5, each support 52 has two ends, and one of the two ends is inserted into the wall 53. In contrast, in the thermal flowmeter of FIG. 6, both of the two ends are inserted into the wall 63.

When the thermal flowmeter detect a parameter, for example, a flow rate of an intake air introduced into the internal combustion engine of an automobile, the thermal flowmeter is subject to temperatures ranging from −40° C. to 110° C., and the thermal flowmeter may undergo a temperature change. The wall 53 thermally expands and contracts according to the ambient temperature. The pair of supports 52, 52 are generally supported by an electrical insulator, which may be made of a synthetic resin having a large expansion coefficient so that the thermal expansion of the synthetic resin produces thermal stresses on the resistor element 70 along its axial direction. As a result, when the thermal flowmeter undergoes a large temperature change or repeated temperature changes, thermal stresses sometimes rupture lead wires 74, 74 of the resistor element 70 and the welding portions 56, 56 that secure lead wires 74, 74 to the supports 52, 52.

The laid-open Publication No. 62-95127 of unexamined Japanese Utility Model Application discloses a resistor element including a pair of curled lead wires so as to buffer stresses on the lead wires by the curled portion. However, it is not easy to work lead wires into the curled shape. Moreover, some curled shapes might make stresses concentrated on the curled portions.

SUMMARY OF THE INVENTION

The present invention was developed in the light of the aforementioned circumstances. Therefore, an object of the present invention is to provide a flowmeter that is durable under thermal stresses, especially when an ambient temperature around the thermal flowmeter frequently varies.

The present invention provides a thermal flowmeter for determining a parameter of a fluid flowing through a passage, comprising (a) a resistor element including: a substrate being electrically insulating; a metallic resistor supported by the substrate and having an electrical resistance which varies with an ambient temperature; and a pair of electrical conductors provided at opposite ends of the substrate and electrically connected to the metallic resistor; and (b) a pair of supports, fixed to a wall defining the passage, for securing the pair of electrical conductors, respectively, at securing portions in the pair of supports so that the resistor element is arranged in the passage, the pair of supports being electrically conductive; wherein a first distance between the pair of supports at the wall is smaller than a second distance between the pair of supports at the securing portions.

Preferably, a first direction defined by portions for fixing the pair of supports at the wall is substantially parallel to a second direction defined by the securing portions in the pair of supports. The first direction may be substantially parallel to axial directions of the pair of electrical conductors. Preferably, the pair of supports are substantially symmetrical with each other with respect to shapes and positions.

The first distance may range from 10% to 90% of the second distance. Preferably, the first distance ranges from 10% to 80% of the second distance. Further preferably, the first distance ranges from 20% to 70% of the second distance.

The pair of supports may have a polar shape having two ends, and one of the two ends is inserted into the wall. Alternatively, the pair of supports may have a polar shape having two ends, and both of the two ends are inserted into the wall.

Preferably, the substrate has a cylindrical shape having an outer circumferential surface and a bore extending between a pair of open ends, the metallic resistor surrounds the outer circumferential surface, and end portions of the pair of electrical conductors are inserted into the pair of open ends of the bore. The metallic resistor may comprise a metallic layer containing platinum. Alternatively, each of the pair of electrical conductors comprises a metallic wire. Preferably, the pair of electrical conductors are secured by welding to the pair of supports.

BRIEF DESCRIPTION OF THE DRAWINGS

The features and advantages of the present invention will be better understood by the following detailed description of preferred embodiment of the invention, when considered in connection with the accompanying drawings, in which:

FIG. 5 illustrates one embodiment of the thermal flowmeter of the related art;

FIG. 6 illustrates one embodiment of the thermal flowmeter of the related art;

FIG. 7 is a schematic view in a longitudinal cross section of one embodiment of a resistor element.

DETAILED DESCRIPTION OF THE PREFERRED EMBODIMENT

Figure 1:
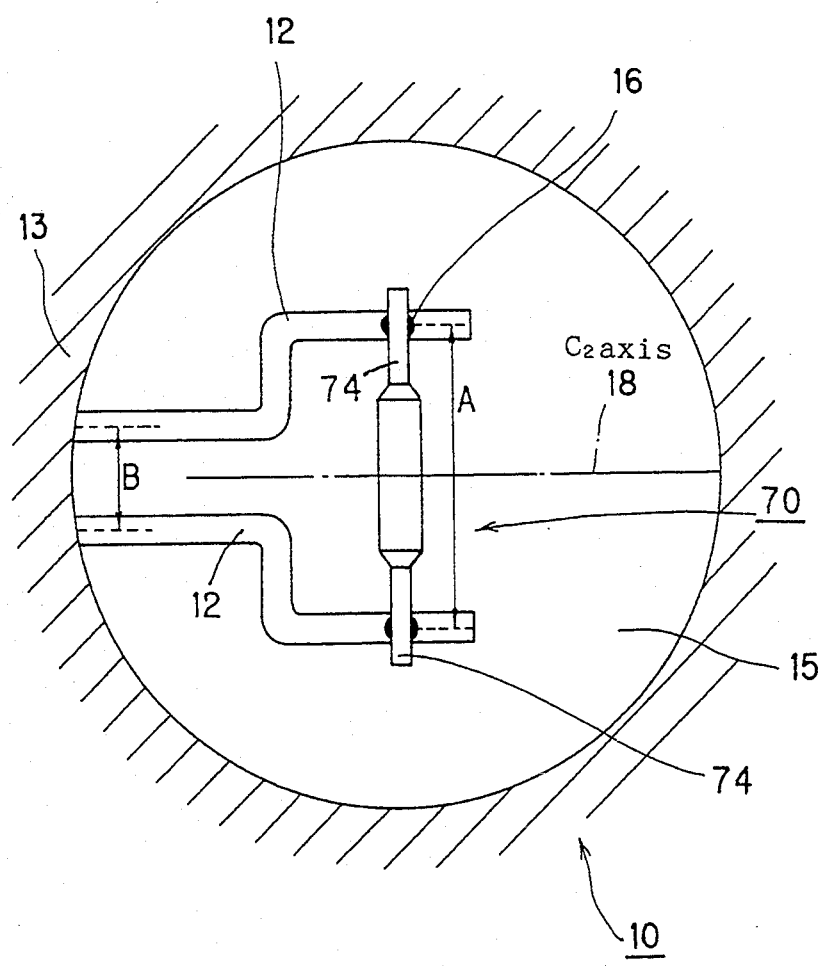
FIG. 1 illustrates one embodiment of the thermal flowmeter of the present invention.

FIG. 1 shows one embodiment of a thermal flowmeter of the present invention, and distance B between the pair of supports 12, 12 at a wall 13 is smaller than distance A between the pair of supports 12, 12 at the securing portions 16, 16 that secure the pair of lead wires 74, 74 of the resistor element 70. As a result, comparing FIG. 1 with FIG. 5, a thermal expansion of the wall 13 between the fixing portions in the wall in FIG. 1 is smaller than a thermal expansion between the fixing portions in the wall in FIG. 5 so that variations in the distance B in FIG. 1 are smaller than variations in the distance B in FIG. 5. Therefore, the resistor element 70 of FIG. 1 is subject to less thermal stresses due to thermal expansion of the wall than the resistor element 70 of FIG. 5.

Distance B may range from 10% to 90% of the distance A. When the distance B is smaller than 10% of the distance A, the wall may not stably fix the pair of supports for a working period of the thermal flowmeter. On the other hand, when the distance B is larger than 90% of the distance A, thermal stresses may not be sufficiently reduced. Preferably, the first distance ranges from 10% to 80% of the second distance. Further preferably, the first distance ranges from 20% to 70% of the second distance.

In FIG. 1, a pair of supports 12, 12 are fixed to a wall 13 defining a passage 15, and the pair of supports 12, 12 secures the pair of electrical conductors 74, 74, respectively, of a resistor element 70 at securing portions 16, 16. Each support 12 has a polar shape with two ends, and one of the two ends is inserted into the wall 13. Each support 12 has two bends of about a right angle, and the support 12 has a zigzag shape.

Figure 2:
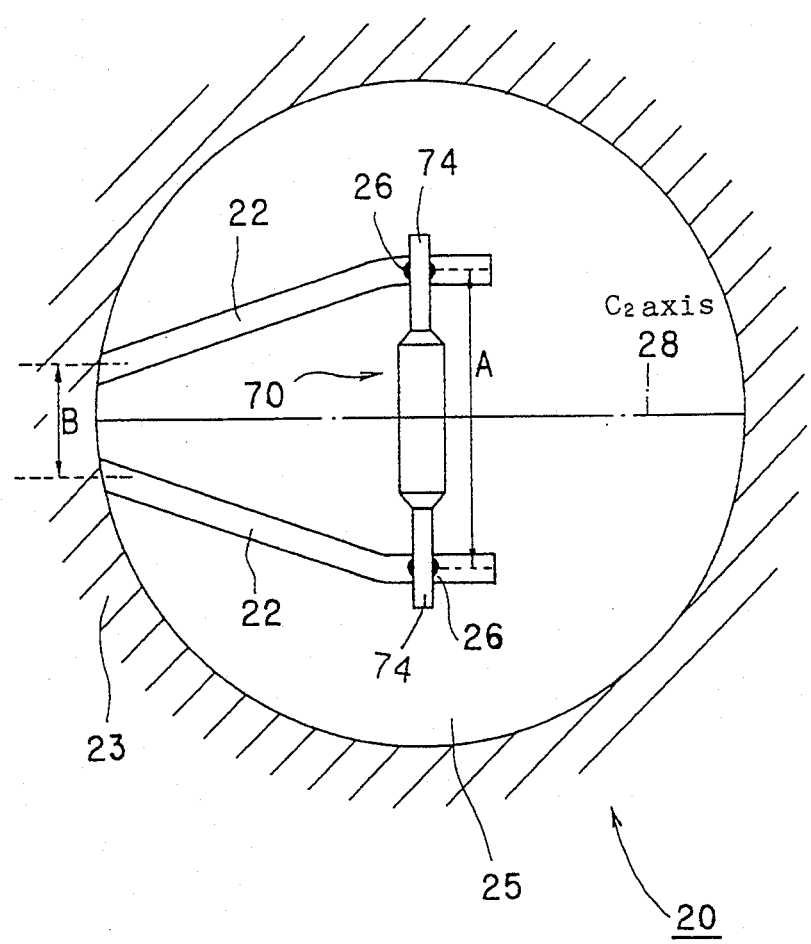
FIG. 2 illustrates one embodiment of the thermal flowmeter of the present invention.

The thermal flowmeter of FIG. 2 has basically the same constitution as that of FIG. 1. However, each support 22 in FIG. 2 has one bend instead of two bends in FIG. 1.

Figure 3:
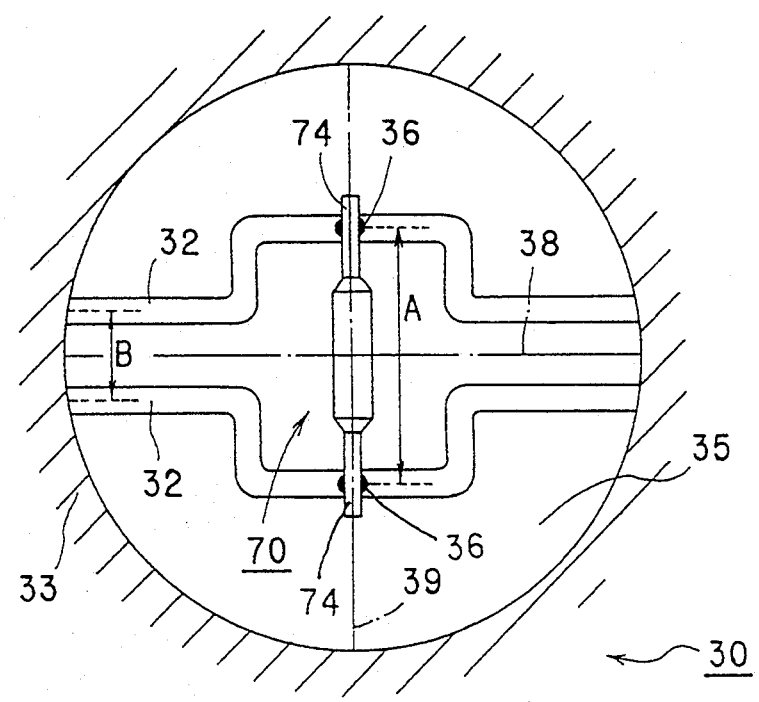
FIG. 3 illustrates one embodiment of the thermal flowmeter of the present invention.

The thermal flowmeter of FIG. 3 has a similar constitution as that of FIG. 1. In the thermal flowmeter of FIG. 3, both ends of each support 32 are inserted into the wall 33 unlike FIGS. 1 and 2. Each support 32 has four bends of about a right angle, and the support 32 has a zigzag shape.

Figure 4:
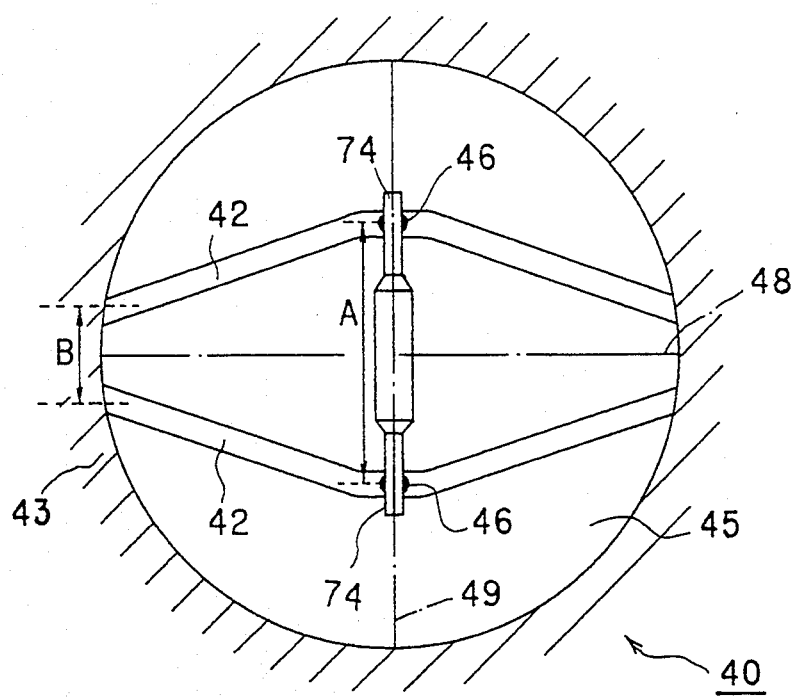
FIG. 4 illustrates one embodiment of the thermal flowmeter of the present invention.

The thermal flowmeter of FIG. 4 is similar to the thermal flowmeter of FIG. 3 in which both ends of each support 42 are inserted into the wall 43. The support 42 in FIG. 4 has two bends instead of four bends in FIG. 3.

The thermal flowmeters of FIGS. 3 and 4 have two distances B in both ends of the supports. In the present invention, it is sufficient that one of the distances B satisfies the relation that the distance B between the pair of supports at a wall is smaller than distance A between the pair of supports at the securing portions that secure the pair of lead wires of the resistor element. Preferably, both distances B are smaller than the distance A.

The support is electrically conductive, and the support may be made of a metal, for example, stainless steel.

Portions of the wall that fix the pair of supports are electrically insulating, and the portions may have a sufficient mechanical strength at a working temperature of the thermal flowmeter. The portions of the wall may be made of a synthetic resin, such as an engineering plastic including polyethylene terephthalate, polyamide, polyacetal, polycarbonate, modified polyphenyleneoxide, etc. The other portions of the wall could be made of the synthetic resin or a metallic material.

In FIG. 1, a direction defined by portions for fixing the pair of supports 12, 12 at the wall 13 is substantially parallel to another direction defined by the securing portions 16 in the pair of supports 12, 12. The former direction refers to a direction of the distance B, and the latter direction refers to the direction of the distance A. This relation also applies to the thermal flowmeters of FIGS. 2, 3, and 4.

In FIG. 1, the latter direction, which is defined by the pair of the securing portions 16, is substantially parallel to axial directions of the pair of electrical conductors 74. This relation also applies to the thermal flowmeters of FIGS. 2, 3, and 4.

In FIGS. 1, 2, 3, and 4, the pair of supports are substantially symmetrical with each other with respect to shapes and positions so that a heat generated in the resistor element 70 equally flows to both supports. Similarly, the pair of lead wires are substantially symmetrical with each other with respect to shapes and positions.

For example, in FIG. 1, the pair of supports 12 are substantially symmetrical each other with respect to shapes and positions by a $C_2$ axis 18. Needless to say, the support 12 itself does not physically rotate by the $C_2$ axis 18. A reflection plane 18 is present also so as to superimpose the pair of supports 12 and the pair of lead wires 74 on each other therethrough. The symmetry relations of FIG. 1 are applied to the thermal flowmeter of FIG. 2 also.

The symmetry relations of FIGS. 1 and 2 are applied to the thermal flowmeter of FIGS. 3 and 4. Moreover, due to the insertion of both ends of the supports into the walls in FIGS. 3 and 4, the thermal flowmeters of FIGS. 3 and 4 further include reflection planes 39, 49 that intersect the resistor element 70 along its axial direction and the lead wires 74, 74 along their axial directions. The reflection planes 39, 49 superimpose the resistor element 70 on itself and the pair of supports on each other. The presence of the reflection planes 39, 49 is preferable so as to equally flow heat from the resistor elements into both ends of each support.

Figure 8:
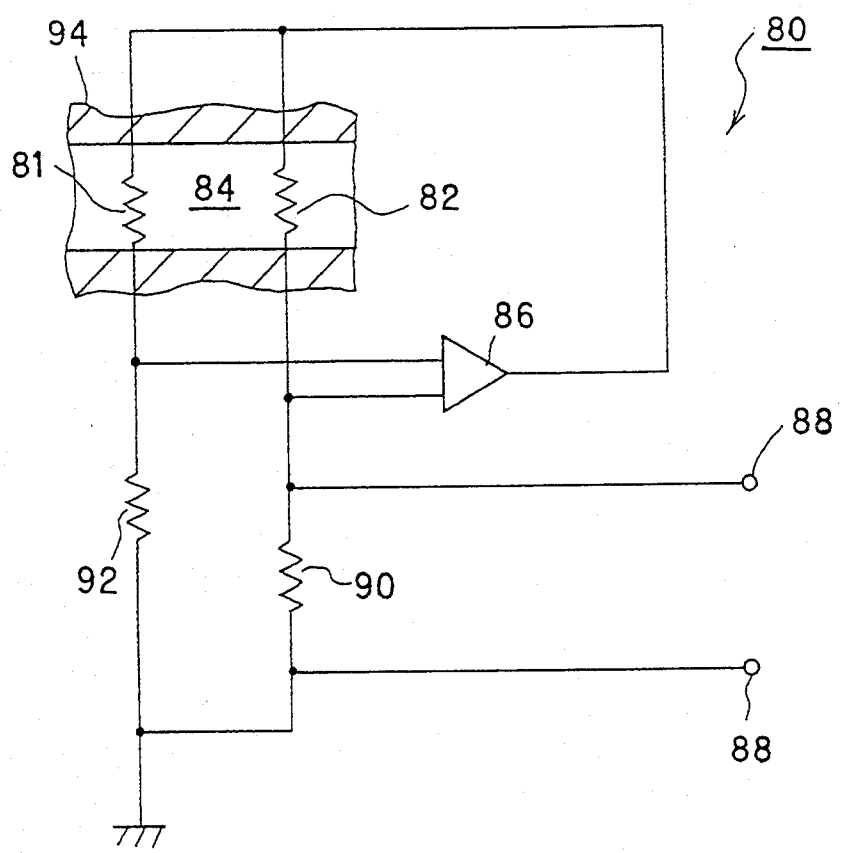
FIG. 8 is a schematic circuit diagram illustrating a control circuit of the thermal flowmeter.

The thermal flowmeter includes two resistor elements 70. In FIG. 8, one of the resistor elements serves as an element 81 for compensating a temperature of a fluid passing through the fluid passage 84, and the other serves as an element 82 for generating heat. Both elements 81, 82 are arranged in the fluid passage 84.

The control circuit 80 includes a bridge circuit consisting of the two elements 81, 82 and two resistors 90, 92. The control circuit 80 is adapted to apply a small electric current to the element 81 so as to generate a negligible amount of heat from the element 81 so that the element 81 has the same temperature as the fluid passing through the passage 84. On the other hand, the control circuit 80 keeps a temperature of the other element 82 higher than the temperature of the element 81 by a constant value that may range from 100° C. to 200° C. The amount of heat generated in the element 82 correlates to the heat deprived from the element 82 by the fluid.

When a flow rate of a fluid passing through the passage 84 varies, an amount of electric current through the element 82 varies accordingly in the control circuit 80 so as to vary an amount of electric current though the resistor 90 that serially connects to the element 82. Amounts of electric current though the element 82 and the resistor 90 relates to an electric current between the output terminal 88, 88. In other words, the output signal between the output terminal 88, 88 is measured so as to obtain a flow rate of the passage 84. Preferably, the fluid passage 84 is diverted from the main passage for the fluid.

A process of making a resistor element 70 is explained hereinafter. An electric insulator 72 as a substrate, may be made of a ceramic material, such as alumina, quartz, etc. The electric insulator preferably has a cylindrical shape having a bore extending between a pair of open ends. The outer diameter of the tube may range from 0.3 mm to 1 mm, and the length along its axial direction may vary from 2 mm to 3 mm. For example, an alumina tube having an outer diameter of 0.5 mm and an inner diameter of 0.3 mm may be used. Alternatively, the substrate may have a planar shape.

In a process of making a resistor element having a metallic film, a metallic film may be disposed around the outer periphery of the tubular substrate 72 by a known method such as sputtering, physical vapor deposition, chemical vapor deposition, electroplating, etc. In FIG. 7, the metallic film 78 is formed onto the outer circumferential surface of the substrate 72. Alternatively, a glass interlayer may be disposed between the substrate and the metallic resistor.

In the subsequent step, the metallic film is trimmed by a laser so that the metallic film has a suitable pattern, such as a spiral or a zigzag pattern. The trimmed metallic film has a predetermined value of electrical resistance. The metallic film may consist essentially of platinum or an alloy containing platinum.

The metallic film may have a thickness ranging from 0.2 to 1.5 $\mu$m. The electrical resistance may range from several to 1000 ohms. The electrical resistance may be adjusted by the thickness, the pattern, a pitch of the spiral pattern, etc. of the metallic film.

A step of fixing lead wires to a substrate can by carried out prior to a final step of forming a glass coat. The step of fixing lead wires may be carried out prior to the step of forming the metallic film, between the step of coating the metallic film and the step of trimming the metallic film, or between the step of trimming the metallic film and the step of forming a glass coat.

The lead wire may be a metallic wire having a diameter ranging from 0.1 to 0.3 mm. The lead wire may be made of a precious metal, such as platinum and rhodium. Alternatively, the lead wire may include a main wire consisting essentially of, for example, stainless steel or an iron-nickel alloy and a layer coated onto a radial surface of the main surface. The layer may be made of a precious metal, such as platinum, or of an alloy including platinum.

A paste fixes the lead wire to the substrate. The paste is preferably electrically conductive, and the paste may include glass and platinum particles dispersed therein. The paste forms a connecting portion 76 that mechanically connects the lead wire 74 to the substrate 72. The connecting portion 76 electrically connect the lead wire 74 to the metallic film 78.

Alternatively, the paste may not necessarily be electrically conductive. In this embodiment, an electrically conductive layer may be formed onto the connecting portion, which is not electrically conductive, so as to electrically connect lead wires to the metallic film through the electrically conductive layer. The electrically conductive layer may be formed of a paste.

In the final step, a glass coat 79 is coated onto the metallic film 78 and the connecting portions 76. For example, a slurry including powder of borosilicate lead glass is prepared, and the precursor of the resistor element may be dipped into the slurry. Alternatively, the slurry may be coated onto surfaces of the precursor by blading or spraying. After drying the slurry onto the precursor, the slurry is fired to form the glass coat.

A process of making a resistor element having a metallic wire is basically the same as the process of making the resistor element having the metallic film. However, instead of forming the metallic film around the substrate, a metallic wire having a high electrical conductivity is wound around the substrate, and both ends of the metallic wire are electrically connected to the pair of lead wires by welding, respectively. The metallic wire may be a platinum wire. For example, an aluminum bobbin having a cylindrical shape, which has an outer diameter of 0.5 mm and an axial length of 2 mm, is wound around by a platinum wire having a diameter of 20 $\mu$m with a pitch of 35 $\mu$m, and the electrical resistance of the platinum wire is about 20 ohms.

EXAMPLE 1

Process of Making a Resistor Element

A resistor element of FIG. 7 is made by following process. A step of making lead wires is explained first. A wire made of a 50 Ni—Fe alloy having a diameter of 2 mm is inserted into a platinum tube having a cylindrical shape with a bore extending to a pair of open ends. The wire and the platinum tube are drawn through a die so as to form a wire having a diameter of 0.15 mm coated with a platinum layer of 5 $\mu$m. The wire is subjected to a heat treatment at 700° C. for one minute. The wire is cut so as to have lead wires clad by platinum having an axial length of 20 mm.

A substrate is an alumina tube having a cylindrical shape with a bore extending to a pair of open ends, and the aluminum tube has an outer diameter of 0.5 mm, an inner diameter of 0.22 mm, and an axial length of 2 mm. A platinum thin film having a thickness of 0.4 $\mu$m is formed onto the outer circumferential surface of the substrate by a sputtering method. Then, the thin film is trimmed by a laser into a spiral pattern so as to have an electrical resistance of 20 ohms.

Subsequently, a pair of the lead wires were inserted into both ends of the substrate having the trimmed platinum film with an electrically conductive paste made of 40% by volume of glass and 60% by volume of platinum particles. The precursor is fired at 600° C. for ten minutes in air so as to fix the lead wires to the substrate by the paste. A glass having a melting point of about 580° C. is coated onto the surface of the film and the connecting portion, and the precursor is fired for five minutes at 580° C. in air to form a protective coat.

A Process of Making a Thermal Flowmeter.

A thermal flowmeter of FIG. 3 is made by a following process. A pair of supports 32, 32 having a diameter of 1 mm were made of stainless steel, and the pair of lead wires 74, 74 of the resistor element 70 were is fixed by projection welding to the pair of respective supports 32, 32. Portions of wall 33 that supports the pair of supports 32, 32 are made of a polyethylene terephthalate having a liner thermal expansion coefficient of $1.6 \times 10^{-5}$/°C. The pair of supports were inserted into and fixed to the wall 33 in a known method. The distance A is 10 mm, and the distance B is 2.5 min. The fluid passage 35 has a diameter of 50 mm.

EXAMPLES 2-5 AND COMPARATIVE EXAMPLE

Examples 2-5 and Comparative Example use the same resistor elements and the same thermal flowmeter of FIG. 3. However, as shown in Table 1, the distances A and B of Examples 2-5 differ from those of Example 1. In Comparative Example, the distance A is the same as the distance B.

TABLE 1

| | DISTANCES | | | FAILURE BY RUPTURE | |
|---|---|---|---|---|---|
| | A (mm) | B (mm) | PASS | LEAD WIRE 74 | CONNECTION 36 |
| Example 1 | 10 | 2.5 | 20 | 0 | 0 |
| Example 2 | 10 | 4 | 20 | 0 | 0 |
| Example 3 | 10 | 6 | 20 | 0 | 0 |
| Example 4 | 10 | 8 | 18 | 0 | 2 |
| Example 5 | 10 | 9 | 16 | 1 | 3 |
| Comp. Ex. | 10 | 10 | 8 | 7 | 5 |

THERMAL STRESS TEST

In each of Examples 1-5 and Comparative Example, twenty samples of the thermal flowmeter undergo a thermal stress test. The samples of the thermal flowmeter are subject to 2000 temperature cycles in air, and each temperature cycle consists of a step of linearly raising a temperature from −40° C. to 125° C. in seven and half minutes and a subsequent step of decreasing a temperature from 125° C. to −40° C. in seven and half minutes. After the temperature cycles, the thermal flowmeter is visually inspected for ruptures at lead wires 74, 74 and connecting portions 36, 36. The result of the thermal stress test is shown in TABLE 1.

In Examples 1-3, all of the twenty samples do not rupture and pass the test. In contrast, in Comparative Example, only eight out of twenty samples pass the test; lead wires 74 rupture in seven samples; and connecting portions 36 that connect lead wires 74, 74 to the supports 32, 32 rupture in five samples. The result of the thermal stress test of Examples 1-5 and Comparative Example in TABLE 1 shows that the durability of the lead wires 74, 74 and the connecting portions 36, 36 improves by making the distance B smaller than the distance A.

As explained above, in the thermal flowmeter of the present invention, a distance B between the pair of supports at the wall is smaller than a distance A between the pair of supports at the securing portions so as to reduce thermal stresses, due to thermal expansion of the wall, on the lead wires of the resistor element and the connecting portions connecting the lead wires to the respective supports, thereby reducing ruptures on lead wires and the connecting portions. Therefore, the thermal flowmeter improves durability under thermal stresses, especially when an ambient temperature frequently varies.

It is to be understood that various alterations, modifications and/or additions which may occur to those skilled in the art may be made to the features of possible and preferred embodiments of the invention as herein described without departing from the spirit and scope of the invention as defined in the claims.

What is claimed is:

1. A thermal flowmeter for determining a parameter of a fluid flowing through a passage, comprising:
    a resistor element comprising:
        (i) an electrically insulating substrate;
        (ii) a metallic resistor supported by said substrate and having an electrical resistance which varies with an ambient temperature; and
        (iii) a pair of electrical conductors provided at opposite ends of said substrate and electrically connected to said metallic resistor; and
    a pair of electrically conductive rigid supports, fixed to a wall defining said passage, for securing said pair of electrical conductors, respectively, at securing portions on said pair of rigid supports so that said resistor element is arranged in said passage;
    wherein a first distance between said pair of rigid supports at said wall is smaller than a second distance between said pair of rigid supports at said securing portions.

2. A thermal flowmeter according to claim 1, wherein a direction of said first distance is substantially parallel to a direction of said second distance.

3. A thermal flowmeter according to claim 2, wherein said direction of said first distance is substantially parallel to axial directions of said pair of electrical conductors.

4. A thermal flowmeter according to claim 1, wherein said pair of supports are substantially symmetrical to each other with respect to shapes and positions.

5. A thermal flowmeter according to claim 1, wherein said first distance ranges from 10% to 90% of the second distance.

6. A thermal flowmeter according to claim 1, wherein said first distance ranges from 10% to 80% of the second distance.

7. A thermal flowmeter according to claim 1, wherein said first distance ranges from 20% to 70% of the second distance.

8. A thermal flowmeter according to claim 1, wherein each of said electrically conductive rigid supports is cylindrical in shape and has two ends, and one of said two ends is inserted into said wall.

9. A thermal flowmeter according to claim 1, wherein each of said electrically conductive rigid supports is cylindrical in shape and has two ends, and both of said two ends are inserted into said wall.

10. A thermal flowmeter according to claim 1, wherein said substrate has a cylindrical shape having an outer circumferential surface and a bore extending between a pair of open ends, said metallic resistor surrounds said outer circumferential surface, and end portions of said pair of electrical conductors are inserted into said pair of open ends of said bore.

11. A thermal flowmeter according to claim 1, wherein said metallic resistor comprises a metallic layer containing platinum.

12. A thermal flowmeter according to claim 1, wherein each of said pair of electrical conductors comprises a metallic wire.

13. A thermal flowmeter according to claim 1, wherein a distance between the entirety of each said securing portion on each said support is greater than said first distance.

14. A thermal flowmeter for determining a parameter of a fluid flowing through a passage, comprising:
  a resistor element comprising:
    (i) an electrically insulating substrate;
    (ii) a metallic resistor supported by said substrate and having an electrical resistance which varies with an ambient temperature; and
    (iii) a pair of electrical conductors provided at opposite ends of said substrate and electrically connected to said metallic resistor; and
  a pair of electrically conductive supports each being cylindrical in shape and having two ends, both of said two ends being fixed to a wall defining said passage, said supports securing said pair of electrical conductors, respectively, at securing portions on said pair of supports so that said resistor element is arranged in said passage;
  wherein a first distance between said pair of supports at said wall is smaller than a second distance between said pair of supports at said securing portions.

* * * * *